Jan. 28, 1964   F. A. DE PUYDT ETAL   3,119,629
VEHICLE AXLE AND SPRING ASSEMBLIES
Filed May 19, 1961   2 Sheets-Sheet 1
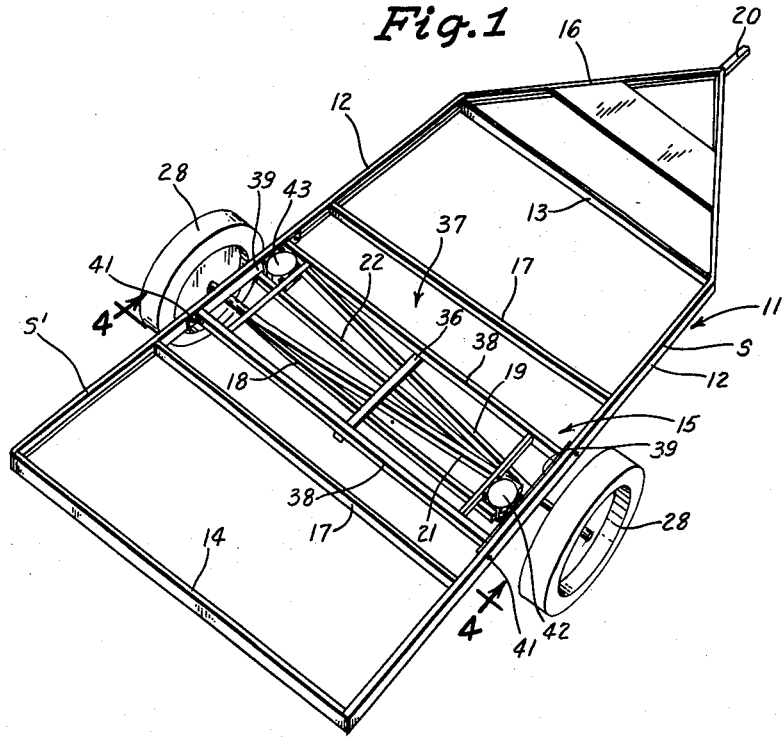
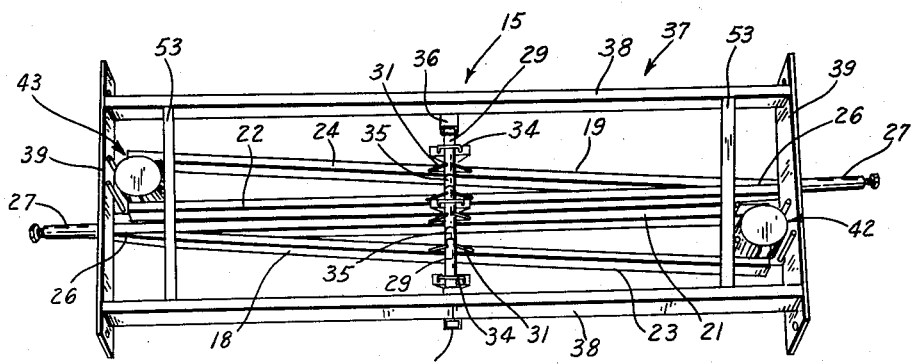
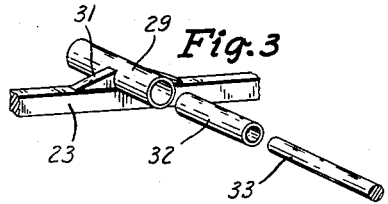
INVENTORS
ROGER SILVER
BY FRANK DE PUYDT
Lowell & Henderson
ATTORNEYS

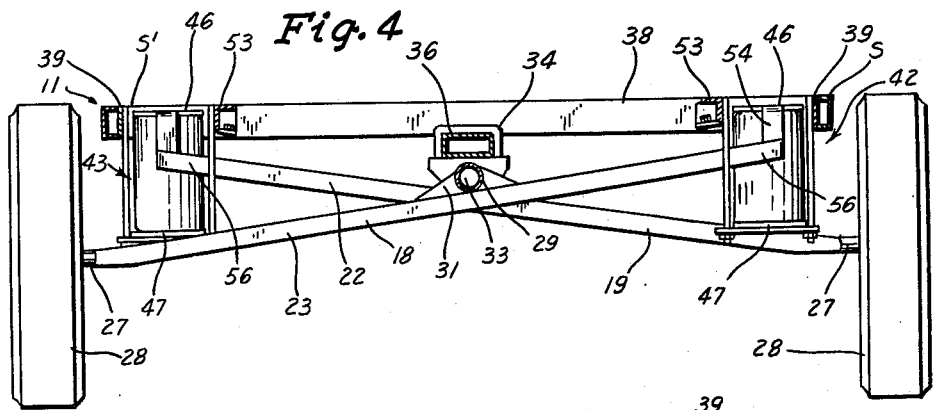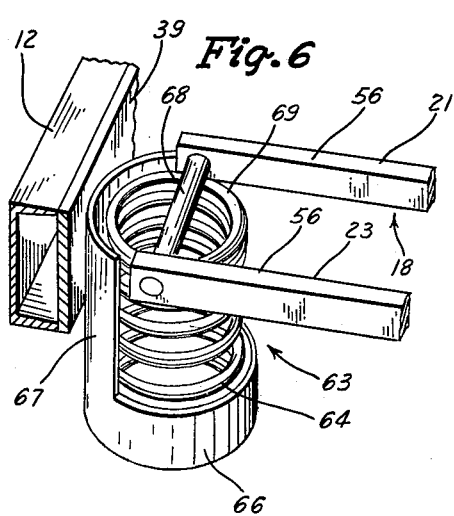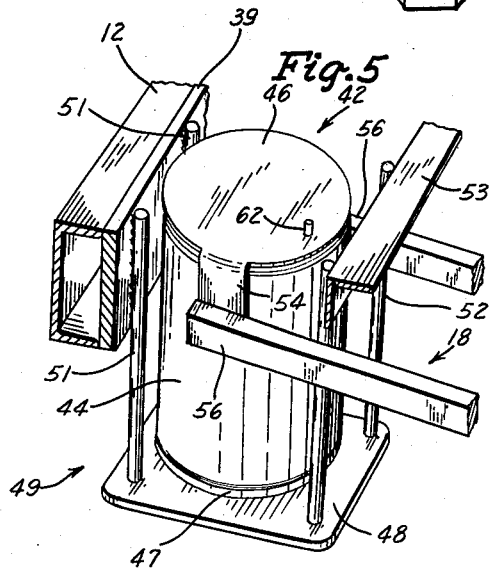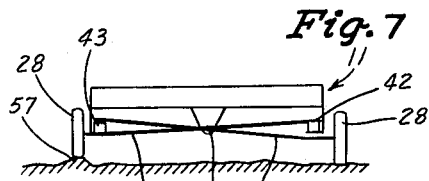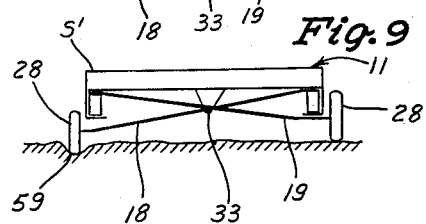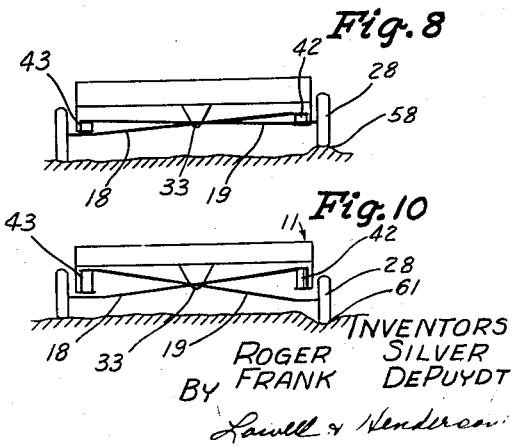

United States Patent Office 3,119,629
Patented Jan. 28, 1964

3,119,629
VEHICLE AXLE AND SPRING ASSEMBLIES
Frank A. De Puydt and Roger C. Silver, Des Moines, Iowa, assignors to Dico Corporation, Des Moines, Iowa, a corporation of Iowa
Filed May 19, 1961, Ser. No. 111,385
3 Claims. (Cl. 280—124)

This invention relates generally to vehicle axle and spring assemblies and in particular to an axle and spring assembly adapted for attachment as a unit to a trailer vehicle.

Axle and spring assemblies now in general use for house trailers, trailers for hauling boats, luggage and the like, generally include a rigid unitary axle provided with ground wheels and equipped with leaf or coil springs supported on the axle in a direct loading relation with the trailer frame. In other words, the trailer frame is mounted directly on the springs. Shock absorbers or stabilizing units are at time utilized with this general type of axle and spring assembly.

In use, this type of assembly although generally satisfactory, is subject to the disadvantage of excessive spring rebound action when absorbing the shock from road irregularities. That is, after absorbing a shock the springs tend to rebound or extend beyond their normal load carrying position. Additionally, the frequency of cyclic action of the springs, namely, the time required for the spring to start from a load carrying position, absorb a shock, and then return to a load carrying position, is too slow. Where bumps or shocks, regardless of magnitude, are encountered in a series or in quick succession, such as on a corrugated road, or on the undulations or payment parting strips on a concrete highway, the springs may be within the cycle of reacting from a first shock, when a second and successive shocks are imposed thereon. The result is that the trailer ride is stiff or hard, evidenced primarily by a jolting or bumpy action of the trailer.

This action is sufficiently severe such that so-called glass or plastic boats are broken in shipment, or by owner transport. In the case of trailers for hauling cars, this action is evidenced by the formation of dents or "peening" in the raceways of the car wheel bearings, resulting from the hammer action of the lowermost ball bearings on the raceways.

Additionally, there is little stability afforded against the tendency of a trailer to tip in a direction away from, or out of the direction of a curve in highway travel, or against "fish tailing" when moving from one lane of travel into the second lane of travel, as in car passing.

These disadvantages are particularly peculiar to trailers, as contrasted to passenger vehicles, because of their load carrying function. Thus the weight of an empty trailer is a fractional part of its load carrying weight. In a passenger vehicle the load carrying weight is a fractional part of the empty weight of the vehicle. The weight and construction of a trailer spring, therefore, is determined on its capacity to handle a full load weight, so that the trailer ride becomes progressively better from its no load to full load condition, without being too generally satisfactory at any load condition and particularly unsatisfactory in the no load condition.

It is an object of this invention, therefore, to provide an improved axle and spring assembly for a vehicle.

A further object of this invention is to provide an axle and spring assembly for a vehicle, wherein relatively movable axle parts react directly, in response to road irregularities, on corresponding yieldable units carried on the vehicle frame so as to continuously maintain a stable and smooth ride of the vehicle.

Still another object of this invention is to provide an axle and spring assembly for a trailer, wherein a scissors action axle unit supports the trailer frame on the pivotal connection of the units, and includes opposite relatively movable end portions which are engageable with vertically arranged spring units that are mounted on the trailer frame so as to be depressible on downward movement of such end portions.

Yet a further object of this invention is to provide a detachable axle and spring assembly that is capable of being readily installed as a unit for the replacement of axle and spring assemblies on existing trailers, or for use as an original part of a trailer, and which is of a construction to eliminate the need for stay rods or the like.

Another object of this invention is to provide an axle and spring assembly for a vehicle wherein an axle unit including relatively movable parts, independently responsive to road irregularities, is associated with a vehicle frame and spring units to permit a high cycling frequency of the spring units.

Yet another object of this invention is to provide an axle and spring assembly for a vehicle wherein the compressibility or load capacity of the springs is adjustable to satisfactorily carry, with an even ride, any desired load or no load, within the load carrying limits of the vehicle.

Further objects, features and advantages of this invention will become apparent from the following description when taken in connection with the accompanying drawing, wherein:

FIG. 1 is a perspective view of a trailer frame showing the axle and the spring assembly of this invention in assembly relation therewith;

FIG. 2 is a perspective view of the axle and spring assembly of this invention;

FIG. 3 is an exploded detail perspective view of a part of the pivotal connection for the axle members of the assembly of this invention;

FIG. 4 is a transverse sectional view as seen along the line 4—4 in FIG. 1;

FIG. 5 is a detail perspective view of a compressible spring unit which forms a part of the axle and spring assembly of this invention;

FIG. 6 is a detail perspective view, illustrated similarly to FIG. 5, showing a modified form of a spring unit; and FIGS. 7, 8, 9 and 10 are diagrammatic illustrations showing the operating action of the axle and spring assembly of this invention in response to road irregularities.

With reference to the drawings the axle and spring assembly of this invention, indicated generally as 15, is illustrated in FIG. 1 in assembly relation with a trailer frame or chassis 11 having side members 12, front and rear end members 13 and 14, respectively, and a tongue structure 16 rigidly secured to the frame 11 and connectable at 20 with a tractor vehicle (not shown). Transverse brace members 17 are connected to the side members 12 at spaced positions between the frame end members 13 and 14.

The axle and spring assembly 15 comprises a pair of axle members 18 and 19 arranged in a side-by-side relation transversely of the frame 11 (FIG. 2). The axle members 18 and 19, when viewed in plan, are of a generally elongated V-shape, with their adjacent leg members 21 and 22, respectively, arranged in planes extended transversely of the trailer frame 11 and their leg members 23 and 24, respectively, diverged outwardly from the opposite ends of corresponding leg members 21 and 22 so as to be in a parallel relation. The apex 26 of each axle member 18 and 19 terminates in an axle or shaft 27 for rotatably supporting an associated wheel 28, as shown in FIG. 1.

As best appears in FIGS. 2 and 4, each of the leg members 21, 22, 23 and 24 over the center portions thereof is provided with a tubular journal 29 carried in an upright mounting plate 31 secured as by welding to the top side of a corresponding leg member. Each journal 29, as illustrated in FIG. 3 for the leg member 23, is operatively associated with a tubular bearing 32. A pivot pin or shaft 33 is inserted through the bearings 32 so as to connect the axle members 18 and 19 together for relative up and down pivotal movement in what may be termed a scissors action. Suitable spacers 35 are mounted about the shaft 33 between the journals 29 for the bearings 32 (FIG. 2).

The shaft 33 is held against rotation within clamp assemblies 34 (FIGS. 2 and 4) rigidly secured in a spaced relation longitudinally of a supporting member 36, that forms part of the frame structure 37 for the axle and spring assembly 15. Additionally the frame structure 37 includes a pair of side members 38 extended between and connected to end plate members 39. The side members 38 extend transversely of the vehicle frame 11 and the supporting member 36 is extended between and secured to the under sides of the members 38 at the longitudinal center portions thereof.

Thus, as best appears in FIG. 2, the axle and spring assembly 15 comprises the axle members 18 and 19, and the axle member supporting frame 37. In the installation of the assembly 15 on a trailer, the end plate members 39 are simply secured, as by bolts 41 (FIG. 1) to corresponding side members 12 of the trailer frame 11. When thus installed the weight of the trailer frame 11, along with any load on the frame, is supported directly on the pivot shaft 33 through the side members 38 for transfer to bellows type spring units 42 and 43, corresponding to the axle members 18 and 19, respectively. Since each spring unit 42 and 43 is of a similar construction and similarly installed in the assembly 15, only the spring unit 42 will be described in detail.

As shown in FIG. 5 the spring unit 42 is comprised of a tubular cylindrically shaped inflatable body member 44 which is closed at its upper end by a plate member 46 and at its lower end by a plate member 47, which is suitably secured to the base 48 of a mounting bracket indicated generally as 49. Projected upwardly from the base 48 are oppositely disposed pairs of mounting arms 51 and 52 with the spring unit 42 being disposed between the arms, so that an arm 51 is diametrically opposite an arm 52. The upper ends of the arms 51 are secured as by welding to an end member 39 of the frame structure 37. In turn, the upper ends of the arms 52 are secured as by welding, to a corresponding supporting member 53 that is connected between the side frame members 38 as best appears in FIG. 2.

It is seen, therefore, that the spring unit 42 is in an upright position connected only at its lower end 47 to the bracket 49 and located at a position adjacent an end member 39 of the frame structure 37.

The upper plate member 46 is integrally formed with a pair of diametrically opposed downwardly extended ears 54 (only one of which is shown in FIG. 5). The terminal ends 56 at the upper end of the axle member 18 form a yoke or bifurcation, arranged in a straddling relation with the upper end of the spring unit 42, and are secured to corresponding ears 54 of the plate member 46. On downward movement of the upper end of the axle member 18, the upper plate member 46 of the spring unit 42 is moved downwardly toward the plate member 47 whereby to compress the inflatable body member 44, which in use is filled with air under pressure.

It is thus seen that the axle member 18 is pivotally moved relative to the pivot shaft 33 in direct response to upward and downward movement of its associated wheel 28, and with this movement in turn acting to move the upper end of the axle member 18 for actuation of the spring unit 42. By virtue of the frame structure 37 being directly connected to the trailer frame 11, such frame is supported directly on the pivot shaft 33 whereby the axle member 18 is movable freely, and independently of the frame 11, in response to up and down movement of a wheel 28.

Since the spring units 42 and 43 are supported at their lower ends 47 from the trailer frame 11, it is apparent that they are compressed downwardly on the frame by the downward movement of the upper ends of the axle members 18 and 19. This downward movement of the axle member upper ends results from the scissors action of the axle members 18 and 19 in response to vertical and lateral movements of the wheels 28 relative to the vehicle frame 11 and resultant vertical movement of the pivot shaft 33.

Should one side S of the vehicle frame 11 be more heavily loaded than its opposite side S' (FIG. 4), the vehicle frame will tend to tilt or pivot about the pivot shaft 33 in a clockwise direction as viewed in FIG. 4. This offset load would be applied on the pivot shaft to provide for the compressing of obth spring units 42 and 43, concurrently with resistance to the tilting movement by the additional compressive action on the spring unit 43 as affected by the upward movement of the lower end 47 of the spring unit 43 by the vehicle frame 11. In other words the spring unit 43 is concurrently acted upon by the downward movement of the upper end of the axle member 19, and the upward movement of the frame side S', whereby to maintain the frame substantially level or in a horizontal plane. As a result of this compression of the spring unit 43 by the downward movement of the upper end of the axle member 19, and the upward movement of the frame side S', the spring unit 43 inhibits, rather than assists, the tendency of the frame 11 to tilt in the direction of the side S, which aggravated assistance would take place if the spring unit 43 were permitted to expand in an upward direction.

In the operation of the spring and axle assembly 15 of this invention, assume the vehicle to be in travel and that a raised road obstruction 57 (FIG. 7) is encountered by the wheel 28 for the axle member 18. To begin with the full height of the obstruction 57 would not be transmitted to the vehicle frame 11 because of the pivotal support of the axle member 18 at the pivot shaft 33 and the free relative pivotal movement of the axle members 18 and 19 about the shaft 33.

The upward movement of the wheel 28 is resisted by the action of the upper end of the axle member 18 to compress the spring unit 42. This action of the axle member 18 on the spring unit 42, in turn tends to tilt the frame 11 in a clockwise direction, as viewed in FIG. 7. However this tilting movement is resisted by the compression of the spring unit 43 resulting from the upward movement thereof against the upper end of the axle member 19. Additionally, the weight of the frame 11 and its supported load tends to maintain a position against vertical movement, due to inertia action, so as to resist any downward movement of the pivot shaft 33 resulting from the spreading scissors action of the axle members 18 and 19.

As a result of these concurrent actions and movements above described, the obstruction 57 is passed over with negligible effect on the horizontal travel of the frame 11, namely, the ride of the frame is both smooth and level Should the wheel 28 for the axle member 19 (FIG. 8) pass over a raised road obstruction 58, these same actions and movements would take place except in a reversed manner, with the action of the axle member 19 and its associated spring unit 43 being substituted in place of the axle member 18 and its associated spring unit 42, relative to the description of these elements in connection with FIG. 7.

Now let it be assumed that the wheel 28 for the axle member 18 (FIG. 9) drops into a depression 59. Similarly to the raised obstruction 57, only about one-half of the depth of the depression 59 would be transmitted to the frame 11 at the pivot shaft 33. In this instance, the axle member 18 tends to pivot in a counterclockwise direction as viewed in FIG. 9, whereby its upper end moves away from the spring unit 42 and the frame 11 tends to tilt in the direction of its side S'. Concurrently with this tendency of the upper end of the axle member 18 to move away from the spring unit 42, the pivot shaft 33 tends to lower, whereby both of the axle members 18 and 19 tend to pivot in directions such that their upper ends tend to move downwardly against corresponding spring units 42 and 43, to compress the same. As a result the frame 11 rides smoothly over the depression 59.

Should the wheel 28 of the axle member 19 (FIG. 10) travel over a depression 61 the action of the axle member 19 and its spring unit 43 would be the same as that described for the axle member 18 and spring unit 42 in FIG. 9, and vice versa.

In the event both of the wheels 28 (FIG. 4) would simultaneously drop into road depressions, the downward or dropping tendency of the frame 11, concurrently lowers the pivot shaft 33 which acts to spread the wheels 28 apart, whereby the spring units 42 and 43 are compressed by the upper ends of the axle members 18 and 19. As the wheels 28 come up out of the depressions, the frame 11 would tend to bounce upwardly, but is restrained against such bouncing action by virtue of the spring units 42 and 43 being held against expansion by the upper ends of the axle members 18 and 19.

In usual spring and axle assemblies, where the springs are axle mounted and the frame is supported directly on the springs, such springs are permitted to expand in response to the upward bounce of the frame so as to actually assist the upward frame movement and thus aggravate the bounce effect of the depression. By virtue of the spring units, in the present invention, being maintained under compression on the frame 11, by the support of the frame on the pivotal shaft or connection 33 for the axle members 18 and 19, the usual bounce or jolt is substantially eliminated from being transmitted to the frame 11.

Likewise should both of the wheels 28 simultaneously pass over a raised road obstruction, the spring units 42 and 43 are simultaneously compressed, thus absorbing any shock and providing for a smooth travel of the frame 11.

Now let it be assumed that the vehicle frame 11 in travel, is making a curve to the left as viewed in FIGS. 1 and 4. The action of inertia throws the weight of the frame 11 toward its side S tending to move such side downwardly. However, this tilting movement is resisted by the compression of the spring unit 43 by the axle member 19, thus maintaining the frame 11 stabilized and with the largest portion of the frame weight being carried by the right-hand wheel 28. For a right-hand curve the stabilizing action would be taken over by the spring unit 42.

By virtue of the support of the frame 11 directly on the pivot means 33, and of the spring units 42 and 43 on the frame 11, the relative pivotal movement of the axle members 18 and 19 to act on the spring units is free and uninhibited. The shock from the wheels 28, resulting from road depressions and obstructions, is thus capable of being fully absorbed by the spring units 42 and 43, without transmittal to the frame 11. In this respect it will be apparent that regardless of the bouncing of the wheels 28, the ride of the frame 11 is always smooth because of its support on the pivot means 33, the relative complementary stabilizing action of the spring units 42 and 43, and the maintenance of the spring units under compression by the upper ends 56 of the axle members 18 and 19. It will be further apparent that since the spring units 42 and 43 are maintained under compression by the axle members 18 and 19 and, therefore, act upwardly on the upper ends of such members, that the spring units through the axle members act to keep the wheels 28 in engagement with the road being traveled.

Additionally, the relative assembly of the spring units 42 and 43, axle members 18 and 19 and frame 11 provides for a high cycling frequency of the spring units 42 and 43. Stated otherwise, the spring units are restrained against movement from fully expanded to fully contracted positions, and are always in a condition to be flexed. As a result the spring units are capable of absorbing the shock from successive obstructions such as in the travel of the trailer over a corrugated road or the like.

As is well known, trailers are subjected to variable live loads. For the purpose of accommodating these variations in trailer loading the inflatable body member 44 of the spring units 42 and 43 is equipped with an air valve 62 (FIG. 5). Depending upon the trailer load, therefore, the air pressure within the inflatable body member 44 may be increased or decreased to in turn increase or decrease the spring pressure or action of the spring units 42 and 43.

In FIG. 6 there is shown a modified form of spring unit 63 which comprises a coil spring 64 mounted within a cup-shaped body member 66 integrally formed with an upstanding wall 67 that extends only partially about the periphery of the cup member 66. This upstanding wall 67 is secured, as by welding, to a corresponding end member 39 of the frame structure 37, so that the coil spring 64 is open to the inside of the vehicle frame 11. The upper end of each axle member 18 and 19, similarly to the axle members 18 and 19 described in connection with FIG. 2, terminates in a yoke, the bifurcations 56 of which are disposed to opposite sides of the coil spring. A bar or cross member 68 is connected between the bifurcations or terminal ends 56 of the leg members of the axle members 18 and 19 so as to extend diametrically across the upper end 69 of the coil spring 64, for engagement therewith.

The operation of the spring unit 63 is in all respects similar to that of the operation of the spring units 42 and 43. In order to accommodate different loads that might be carried by the trailer, it will be appreciated that the coil spring 64 may be changed from the straight helical form illustrated, to a tapered coil spring or to a coil spring of uniform diameter but with variable spacing between the helices thereof.

The invention thus provides a detachable axle and spring assembly 15 for a trailer vehicle wherein the trailer frame 11 is maintained substantially level under all conditions of road travel, by virtue of a pair of pivoted scissors action axle members 18 and 19 arranged criss-cross in a side-by-side relation, transversely of the vehicle frame 11, and with their upper ends acting to engage and compress corresponding associated trailer frame mounted spring units 42 and 43. Since the trailer frame 11 is supported on the pivotal connection 33 of the axle members 18 and 19, such members are capable to float or move freely, relative to each other, in response to road obstructions or depressions engaged by the trailer wheels 28. This axle member movement is transferred directly to and is absorbed by the spring units 42 and 43, so that movement of the frame 11 is limited substantially only to its movement with, or about, the pivot shaft 33 for the axle members 18 and 19, as restricted by the complementary stabilizing action of the axle members 18 and 19 and their associated spring units.

Additionally, the location of the pivot connection 33 intermediate the ends of the axle members 18 and 19 appreciably reduces the application of the full height of a depression or an obstruction, to the vehicle frame 11. In other words, the vertical movement of the frame 11 is always appreciably less than any vertical movement of the upper end of a spring unit.

To further aid a smooth riding action of the vehicle frame 11 it will be apparent from a consideration of FIGS. 1 and 2 that the axles 27 for the wheels 28 are offset longitudinally of the trailer frame 11, so as not to be directly opposite each other transversely of the frame. As a result, and particularly in the travel of the vehicle on concrete highways, transverse undulations and parting strips are encountered in succession, rather than simultaneously, by the vehicle wheels 28.

Although the invention has been described and illustrated with respect to a preferred embodiment thereof it is to be understood that it is not to be so limited since changes and modifications can be made therein which are within the full intended scope of this invention as defined by the appended claims.

I claim:

1. An axle and spring assembly for a vehicle having a main frame, said assembly including an elongated frame structure having side members extendible transversely of said frame and detachably connectable to said main frame, a pair of axle members arranged in a criss-cross relation longitudinally of said frame structure and between the side members thereof, each axle member having bearing means extended transversely of said frame structure, a common pivot means carried in said bearing means connecting said axle members at longitudinal center portions thereof for relative pivotal movement of the ends of said axle members, means supporting said pivot means from said side members, with the lower end of each axle member being formed with a shaft portion, a wheel mounted on each of said shaft portions, and a pair of vertically arranged yieldable compressible units corresponding to said axle members and mounted in a longitudinally spaced relation on said frame structure, with each axle member having the upper end thereof operatively associated with a corresponding yieldable unit so that the unit is compressed on downward movement of said upper end.

2. An axle and spring assembly for a vehicle having a main frame, said assembly including a frame structure detachably connectable to said main frame and having at least one member extendible transversely of said main frame, a pair of axle members arranged in a crisscross relation longitudinally of said frame structure with the lower end of each axle member terminating in a shaft portion, a wheel rotatably mounted on each of said shaft portions, a common pivot means connecting said axle members at longitudinal center portions thereof for relative pivotal movement of the ends of said axle members, means connecting said pivot means to the mid-section of said transverse member, a pair of yieldable compressible units corresponding to said axle members, and means mounting said yieldable units on opposite sides of said frame structure so that one end of a yieldable unit is movable toward and away from the other end thereof, with the upper end of each axle member being operatively engageable with one end of a corresponding yieldable unit so that on downward movement of the upper end of an axle member the corresponding yieldable unit is compressed.

3. An axle and spring assembly for a vehicle having a main frame, said assembly including a frame structure detachably connectable to said main frame and having at least one member extendible transversely of said main frame, a pair of axle members arranged in a crisscross relation longitudinally of said frame structure with the lower end of each axle member terminating in a shaft portion, a wheel rotatably mounted on each of said shaft portions, pivot means connecting said axle members at longitudinal center portions thereof for relative pivotal movement of the ends of said axle members, means connecting said pivot means to said transverse member, a pair of yieldable compressible units corresponding to said axle members, and means mounting said yieldable units on opposite sides of said frame structure so that one end of a yieldable unit is movable toward and away from the other end thereof, with the upper end of each axle member being operatively engageable with one end of a corresponding yieldable unit so that on downward movement of the upper end of an axle member the corresponding yieldable unit is compressed.

References Cited in the file of this patent

UNITED STATES PATENTS

| | | |
|---|---|---|
| 844,615 | Palmer | Feb. 19, 1907 |
| 2,512,057 | Fowler | June 20, 1950 |
| 2,673,732 | Heston | Mar. 30, 1954 |
| 2,717,152 | Hopkins | Sept. 6, 1955 |
| 2,827,282 | Weiss | Mar. 18, 1958 |